United States Patent [19]

Bertrand

[11] Patent Number: 5,066,120

[45] Date of Patent: Nov. 19, 1991

[54] OPTICAL DEVICE FOR PHASE DETECTION TESTING OPTICAL SYSTEM, ESPECIALLY OPHTHALMIC LENSES

[75] Inventor: Patrick Bertrand, Issy les Moulineaux, France

[73] Assignee: Essilor International, Cie Generale d'Optique, Creteil Cedex, France

[21] Appl. No.: 527,344

[22] Filed: May 23, 1990

[30] Foreign Application Priority Data

Jun. 5, 1989 [FR] France .................... 89 07386

[51] Int. Cl.$^5$ ............................................ G01B 9/00
[52] U.S. Cl. ................................................... 356/124
[58] Field of Search ............... 356/124, 125, 126, 127

[56] References Cited

PUBLICATIONS

Applied Optics, vol. 27, No. 3, Feb. 1988, pp. 523-528; K. Omura et al.: "Phase Measuring Ronchi Test", * pp. 525-527 *.
Applied Optics, vol. 23, No. 20, Oct. 1984, pp. 3676-3679; T. Yatagai: "Fringe Scanning Ronchi Test for Aspherical Surfaces", * pp. 3677-3678 *.

Primary Examiner—F. L. Evans
Attorney, Agent, or Firm—Charles A. Brown

[57] ABSTRACT

A device for phase detection testing any kind of optical system, in particular an ophthalmic lens, comprises along an optical axis, an emission device which constitutes a light source, a holding station which receives the optical system under test, an array, a receiving device which receives the image observable downstream of the array, and a data processing device which exploits this image by phase detection. Between the holding station and the array is a convergence adapter element and the data processing device includes a ray plotting program and a calibration system allowing for theoretical and manufacturing aberrations due to the convergence adapter element.

8 Claims, 1 Drawing Sheet

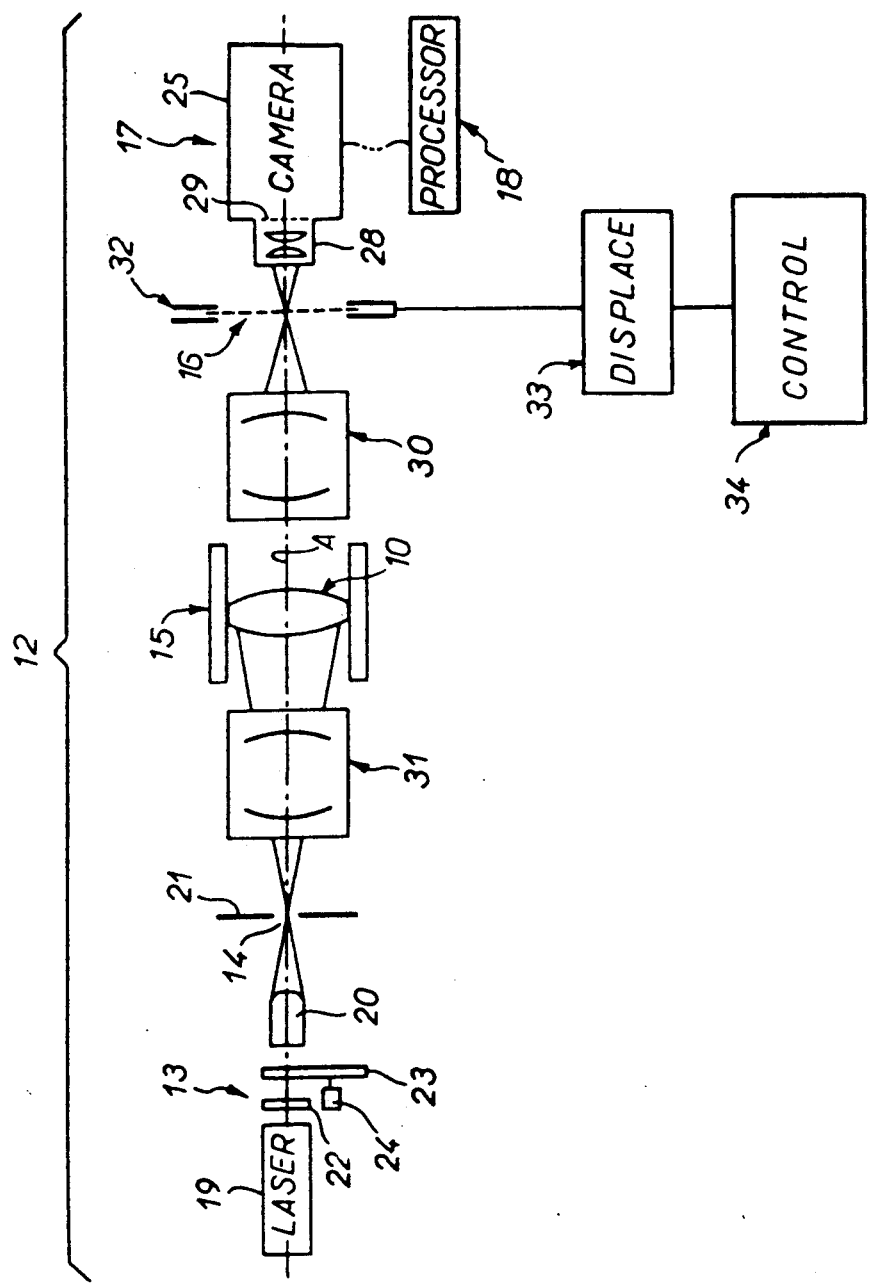

OPTICAL DEVICE FOR PHASE DETECTION TESTING OPTICAL SYSTEM, ESPECIALLY OPHTHALMIC LENSES

BACKGROUND OF THE INVENTION

1. Field of the invention

The present invention is generally concerned with testing any kind of optical system.

It is more particularly, but not necessarily exclusively, directed to testing an ophthalmic lens.

2. Description of the prior art

It has already been proposed to employ the RONCHI test to test an optical system using phase detection.

The known RONCHI test entails disposing at the point of convergence of the light wave from the optical system under test a diffraction array or grating of alternately opaque and transparent parallel lines and analyzing the system of fringes that can then be observed downstream of the array.

According to the laws of geometric optics, and ignoring diffraction phenomena, these fringes are always the same and depend only on the direction of the light rays constituting the wave concerned, without depending in any way at all on the nature of the medium that it has passed through. This being so, the fringes are characteristic of the aberrations of this wave.

Their slope represents the difference between the corresponding wave surface and the theoretical wave surface to which it should conform.

It then suffices to measure this slope at all points of the optical system under test, which is done in practice using the phase detection technique, and then to carry out an integration.

A method of this kind can be used to measure any defects of an optical system irrespective of its quality and has the advantage of being simple and of yielding very accurate results.

An optical device enabling this kind of method to be implemented is described in the article "Fringe scanning Ronchi test for aspherical surfaces" in the journal "APPLIED OPTICS", volume 23, number 20, of 15 Oct. 1984, and in the article "Phase measuring Ronchi test" in the same journal, volume 27, number 3, 1 Feb. 1988.

This optical device comprises, along an optical axis, emission means adapted to constitute a point source of coherent light, a holding station adapted to receive the optical system under test, a RONCHI grating, receiving means adapted to receive the image observable downstream of the RONCHI grating, and data processing means adapted to exploit this image by phase detection.

However, experience shows that as implemented this optical device cannot achieve the hoped for degree of accuracy.

A general object of the present invention is a diffraction array-based optical device with significantly improved accuracy.

SUMMARY OF THE INVENTION

The present invention consists in a diffraction array-based optical device for phase detection testing an optical system comprising, on an optical path, emission means adapted to constitute a light source, a holding station adapted to receive the optical system under test, an array, receiving means adapted to receive the image observable downstream of the array, and data processing means adapted to exploit this image by phase detection, wherein there is disposed between the holding station and the array a convergence adapter element and the data processing means include a ray plotting program and calibration means allowing for theoretical and manufacturing aberrations due to the convergence adapter element.

Given the implementation in accordance with the invention of the calibration means, this convergence adapter element has no effect on the accuracy of the results obtained.

In accordance with one feature of the invention, it is possible to use between the light source and the holding station a numerical aperture adapter element allowing for the numerical aperture and the object and image focal lengths of the optical system under test.

In accordance with the invention, the calibration means then also allow for theoretical aberrations and aberrations resulting from the manufacture of the numerical aperture adapter element.

Thus in accordance with the invention the characteristics of the convergence adapter element and the numerical aperture adapter element, if used, are systematically allowed for, to the benefit of the accuracy of the results obtained.

The theoretical aberrations allowed for by the calibration means used in accordance with the invention mean here, in the usual way, the aberrations due only to the combination of the optical components of the optical system under test, these being regarded as perfect in themselves.

The ray plotting program included in the data processing means that the device in accordance with the invention comprises advantageously enables these theoretical aberrations to be calculated for each optical surface in succession by simple application of DESCARTES' law.

What is more, the device in accordance with the invention has the advantage of being usable with various types of diffraction array.

Phase diffraction arrays such as WOLLASTON prisms are just as feasible for implementing the invention as amplitude diffraction arrays such as gratings RONCHI arrays.

The device in accordance with the invention may, if required, use an incoherent spatially extended light source which has the advantage of achieving greater accuracy than a point light source, especially when using an amplitude array.

By incoherent spatially extended light source is meant here a light source as defined in M. FRANCON's "HOLOGRAPHIE", (Editions MASSON et Cie, 1969), pages 9 and 10.

Here an incoherent spatially extended light source can be used to obtain good quality fringes resulting from the superposition of a plurality of systems of fringes.

A rotating diffusing screen with the appropriate grain and speed of rotation is in practice sufficient to achieve this.

The characteristics and advantages of the invention will emerge from the following description given by way of example with reference to the appended diagrammatic drawing in which the single figure is a block diagram in plan view of an optical device in accordance with the invention.

DETAILED DESCRIPTION OF THE INVENTION

The figure shows by way of example the application of the invention to the situation where the optical system 10 under test is an ophthalmic lens.

As shown, this may be a convex ophthalmic lens, for example, that is to say a lens with a positive optical power.

However, it could equally well be a concave ophthalmic lens, that is to say a lens having a negative optical power.

More generally, it could equally well be any other kind of optical system.

The optical device 12 used for testing the optical system 10 comprises, along an optical path with axis A, emission means 13 adapted to constitute a light source, a holding station 15 adapted to receive an optical system, a diffraction array or grating 16, receiving means 17 adapted to receive the image observable on the downstream side of the grating 16 and data processing means 18 adapted to exploit this image by phase detection.

By data processing means is meant in this context both the data processing hardware employed and the associated software.

In the embodiment shown the emission means 13 comprise, in succession and in a known way, a laser 19 and an objective lens 20 focussing the light beam emitted by the laser 19 at a point constituting the light source and located at the hole in a diaphragm 21, with a density means for varying transmitted light intensity 22 optionally disposed between the laser 19 and the objective lens 20.

In a way that is also known in itself the grating 16 is a RONCHI grating, for example, that is to say grating formed of alternately opaque and transparent parallel lines with a line spacing in the order of 0.25 to 4 mm, for example, and the receiving means 17 comprise a camera 25 of which the objective lens 28 and the scanning plane 29 are schematically represented.

This is a mosaic type camera, for example, that is to say a charge-coupled device (CCD) camera adapted, by scanning, to measure the quantity of light received at each point on its scanning plane 29, this scanning plane 29 constituting the means which actually receive the observable image.

In accordance with the invention, the optical device 12 comprises between the holding station 15 and the grating 16 a convergence adapter element 30 adapted to allow for the convergence of the optical system 10 under test and may comprise, as is well known, a continuous aperature and f/number zoom lens and the data processing means 18 comprise a ray plotting program and calibration means adapted to allow for theoretical and manufacturing aberrations due to the convergence adapter element 30.

In the emboodiment shown the ooptical device 12 in accordance with the invention further comprises between the light source 14 and the holding station 15 a numerical aperture adapter element 31 adapted to allow for the numerical aperture and the object and image focal lengths of the optical system 10 under test and may comprise, as is well known, a continuous aperature and f/number zoom lens and the calibration means that the data processing means 18 include are adapted to allow also for theoretical and manufacturing abberations due to this numerical aperture adapter element.

The various components of the optical device 12 thus constituted are preferably carried by a common frame and at least some of them are free to move relative to the frame.

As the corresponding arrangements will be well known to those skilled in this art they will not be described here.

Suffice to say that the grating 16 is carried by plates 32 adapted to enable it to move in translation in either of two orthogonal directions perpendicular to the optical axis A and to rotate about a direction orthogonal to the previous two.

Taken as a whole, these plates 32 are further adjustable by displacement means 33 in position along the optical axis A so that the grating 16 that they carry can be disposed at or near the point of convergence of the light beam reflected by the optical system 10 under test.

They are preferably governed by control means 34 so that they can be displaced in a controlled way.

Similarly, the camera 25, the convergence adapter element 30 and the numerical aperture adapter element 31 are preferably movable along the optical axis A.

However, in this case positioning chocks are provided on the corresponding slideways to serve as reference points, in order to retain the previous calibration, should any components need to be changed (grating, adapter element, etc).

The light beam from the emission means 13 of the light source 14 is in practice monochromatic. It passes through the numerical aperture adapter element 31, the optical system 10 under test and the convergence adapter element 30 before converging onto the array 16.

It will be noted that this light beam is divergent at the entry to the optical system under test in the embodiment shown.

In any event, the arrangements are preferably such that it is not a parallel beam at this point.

In practice the array 16 is placed in the vicinity of the point of convergence of the wave emerging from the convergence adapter element 30 in order to minimize the number of fringes in the observable image and thus to facilitate subsequent operations and increase the accuracy of the results obtained.

Because of inevitable defects in the optical system 10 under test the wave surface reaching the grating 16 features aberrations. Observation of the fringes makes it possible to evaluate these aberrations.

As previously explained, the slope of these fringes represents the difference between the wave surface tested and the theoretical wave surface.

To work back to the transverse aberration of the wave surface under test it is therefore sufficient, using the phase detection technique, to carry out a series of measurements with phase shifts between them, by moving the grating 16 stepwise a specific distance perpendicular to the optical axis A.

The number of such measurements is preferably odd.

In practice measurements in two orthogonal directions are needed to calculate the slope.

An integration is then sufficient to obtain the distance or nominal deviation between the wave surface under test and the theoretical wave surface at the point in question.

In practice all displacements of the mobile elements concerned are controlled by software enabling systematic and immediate exploitation of the results.

As software of this kind does not of itself constitute any part of the present invention it will not be described here.

The same applies to the ray plotting program which, in accordance with the invention, the data processing means 18 include.

A ray plotting program of this kind is conventional and therefore totally familiar to those skilled in the art. It is limited to applying DESCARTES' law (n sin i = n' sin i') to the successive optical surfaces.

With regard to the calibration means that, in accordance with the invention, the data processing means 18 also include, the sum of the aberrations to be allowed for is stored in a calibration file and is systematically subtracted from all the measurements carried out.

The calibration file is obtained in the following manner:

In a first stage the theoretical system of fringes $F_1$ that would be obtained if the convergence adapter element 30, the numerical aperture adapter element 31, if used, and the optical system 10 under test were perfect, that is to say if they had geometrical and optical characteristics strictly identical to their theoretical characteristics, is calculated.

In a second stage a measurement is carried out with a perfect calibration system substituted for the optical system 10 and a system of fringes $F_2$ is obtained.

In a third stage the theoretical system of fringes F3 which would be obtained with this perfect calibration system, the convergence adapter element 30 and the numerical aperture adapter element 31, if used, assumed to be perfect, is calculated.

The difference $(F_2-F_3)$ is representative of manufacturing defects of the convergence adapter element 30 and the numerical aperture adapter element 31, if used.

The calibration file $F_C$ is equal to:

$$F_C=(F_2-F_3)+F_1$$

Let FM denote the system of fringes determined by the apparatus using the optical system 10.

The integration yielding the distance or nominal deviation between the wave surface under test and the theoretical wave surface will be carried out using the system of fringes resulting from the difference $(F_M-F_C)$ As explained above, the aberrations systematically taken into account in accordance with the invention in respect of the convergence adapter element 30 and the numerical aperture adapter element 31 are the theoretical and/or manufacturing aberrations of these elements.

The resulting aberrations, as calculated on the basis of the difference $(F_M-F_C)$, essentially depend only on defects of the optical system 10 under test.

It is therefore possible to deduce these defects very accurately.

In practice the accuracy of each of the optical surfaces of the convergence adapter element 30 and/or the numerical aperture adapter element 31 may advantageously be in the order of one wavelength whereas for analogous elements with no calibration means it must be no more than a fraction in the order of 1/20th of one wavelength.

This advantageously reduces the unit cost of the optical device 12 in accordance with the invention.

In an alternative embodiment of the invention the light source is an incoherent spatially extended light source such as that defined in the work by M. FRANCON referred to above.

The hole in the diaphragm 21 defines its size.

The diameter of this hole and therefore of the source is in practice smaller than but of the same order of magnitude as the time spacing of the grating 16.

This diameter is preferably equal to one-half the spacing of the grating 16.

To achieve the required incoherence a diffusing screen 23 rotated by a motor 24 is placed between the laser 19 and the objective lens 20 on,the, downstream side of the density means for varying transmitted light intensity 22.

In this way there is no phase relationship between the various points of the light source used in accordance with the invention.

It will be readily understood that it is possible to modify the extent of the light source, if required.

It is sufficient, for example, to move the objective lens 20 when, as shown, it is on the output side of the diffusing screen 23.

If it is on the input side of the diffusing screen 23, it is sufficient to move the latter.

As previously explained, the grating 16 could be a phase array such as a WOLLASTON prism, for example, instead of an amplitude grating such as a RONCHI grating.

As is known, a WOLLASTON prism is formed by two single-axis birefringent prisms glued together with their axes perpendicular.

If a WOLLASTON prism is used it is necessary to associate with it in the known way two polarizers whose axes are oriented differently to those of the WOLLASTON prism.

The axes of these polarizers are preferably at 45° to the axes of the WOLLASTON prism.

It should also be emphasized that the optical device in accordance with the invention may equally well be used to test graded index optical systems, to determine the index profile, for example.

The present invention is therefore not limited to the embodiments described and shown but encompasses any variant execution and/or combination of the various component parts and any variant application.

I claim:

1. Optical device for phase detection testing of an optical system comprising, on an optical path, emission means defining a light source, a holding station for receiving an optical system under test, a diffraction array, image receiving means for receiving an image observable optically downstream of said diffraction array, data processing means connected to the receiving means for exploiting the image by phase detection, a convergence adapter element disposed between said holding station and said diffraction array, said data processing means having a ray plotting program and calibration means for compensating for theoretical and manufacturing abberations due to said convergence adapter element.

2. Optical device according to claim 1, further comprising displacement means for adjustably displacing said diffraction array for translation in either of two orthogonal directions and for rotation about a direction perpendicular to said two directions.

3. Optical device according to claim 2, further comprising control means for controlling said displacement means.

4. Optical device according to claim 2, wherein said displacement means further provides adjustable displacement of said diffraction array along the optical path.

5. Optical device according to claim 1, further comprising a numerical aperture adapter element, said calibration means also including means compensating for theoretical and manufacturing abberations due to the numerical adapter element.

6. Optical device according to claim 1, wherein the light source is an incoherent spatially extended light source.

7. Optical device according to claim 1, wherein said diffraction array comprises a Ronchi grating.

8. Optical device according to claim 1, wherein said diffraction array comprises a Wollaston prism.

* * * * *